United States Patent [19]

Lopatin et al.

[11] Patent Number: 4,828,772
[45] Date of Patent: May 9, 1989

[54] MICROPOROUS MEMBRANES OF ULTRAHIGH MOLECULAR WEIGHT POLYETHYLENE

[75] Inventors: George Lopatin, Newton Centre; Larry Y. Yen, Tewksbury, both of Mass.

[73] Assignee: Millipore Corporation, Bedford, Mass.

[21] Appl. No.: 192,595

[22] Filed: May 9, 1988

Related U.S. Application Data

[62] Division of Ser. No. 658,600, Oct. 9, 1984, Pat. No. 4,778,601.

[51] Int. Cl.$^4$ .................. B29C 43/00; B29C 55/12; C08J 9/28
[52] U.S. Cl. .................................. 264/45.9; 214/51; 214/176.1; 214/DIG. 48; 214/DIG. 62
[58] Field of Search .................. 264/41, 45.8, 45.9, 264/46.1, 51, 176.1, DIG. 48, DIG. 62

[56] References Cited

U.S. PATENT DOCUMENTS 4,057,481 11/1977 Lee et al. ..................... 204/296
4,140,815 2/1979 Dege et al. ..................... 427/44

Primary Examiner—Frank Sever
Attorney, Agent, or Firm—Hamilton, Brook, Smith & Reynolds

[57] ABSTRACT

Microporous membranes and methods for producing such membranes from ultrahigh molecular weight polyethylene are described. The method employs extrusion of a solution of UHMW-PE and porogen through a forming die followed by thermal phase separation of polymer and porogen. Microporous structures are created by removing porogen. Microporous membranes produced include membranes with good permeability to air and water making them particularly useful as filtration media and water-resistance breathable membranes.

15 Claims, 6 Drawing Sheets

MICROPOROUS MEMBRANES OF ULTRAHIGH MOLECULAR WEIGHT POLYETHYLENE

This application is a division of application Ser. NO. 658,600, filed 10/9/84, now U.S. Pat. No. 4,778,601.

TECHNICAL FIELD

This invention is in the field of polymer technology and more specifically relates to microporous membranes formed from ultrahigh molecular weight polyethylene (UHMW-PE).

BACKGROUND ART

Microporous membranes include thin sheets and hollow fibers generally formed from synthetic thermoplastic materials and having a substantially continuous matrix structure containing pores or channels of small size. The size range for pores of "microporous membrane" is not precisely defined in the art, but is generally understood to extend from about 0.05 to about 10 micrometers.

A wide variety of polymeric materials have been employed to produce microporous membranes. Examples of these polymers include: polyolefins such as low density polyethylene, high density polyethylene, and polypropylene; vinyl polymers; acrylic polymers such as polymethylmethacrylate and polymethylacrylate; oxidation polymers such as polyphenylene oxide; fluoropolymers, such as polytetrafluoroethylene and polyvinylidene fluoride; and condensation polymers such as polyethylene terephthalate, nylons, polycarbonates and polysulfones.

Despite the wide variety of polymers employed in the production of microporous membranes, there have been no reports in the literature of the production of microporous UHMW-PE membranes employing conventional extrusion equipment and/or methodology. This is particularly noteworthy because UHMW-PE is known to have outstanding properties. Like other polyethylenes, it possesses a nonadherant surface, low coefficient of friction and good chemical resistance. In addition, UHMW-PE exhibits very high abrasion resistance and impact resistance. UHMW-PE also has outstanding resistance to stress cracking.

Because of its outstanding properties, there has been much effort directed to forming articles from UHMW-PE, but processing UHMW-PE has proven to be very difficult. This polymer does not flow under ordinary conditions; therefore, it has been formed into shaped articles under high pressure, high temperature and very long heating times. Such conditions usually degrade the properties of UHMW-PE. Extrusion on typical extrusion equipment has not usually been possible and processing has often been based on powder metallurgy techniques, such as sintering.

A common technique which has been employed for processing molten UHMW-PE polymer is compression molding. Ram extrusion has also been employed. Twin screw extrusion with corotating screws has also been tried with a special extrusion grade material but has been increasingly abandoned because of problems with voids and internal stresses in the molded parts. See Birnkraut, W. H., Braun, G. and Falby, J., "Ultrahigh Molecular Weight Polyethylene—Processing and Properties", *J. Appl. Poly. Sci.: Appl. Poly. Sym.*, 36, 79–88 (1981).

Compression molding of UHMW-PE into films has been reported by Smith and Lemstra. See, Smith, P. and Lemstra, P. J., "Ultra-Drawing of High Molecular Weight Polyethylene Cast From Solution", *Colloid Polym. Sci.*, 258, 891 (1980). In this work, compacted UHMW-PE powder was compression molded at 160° C. into films having a thickness of 0.16 mm. These films were solidified by quenching them to room temperature.

In addition, Smith and Lemstra have reported production of UHMW-PE films by casting of the polymer from relatively dilute solutions in decalin. See Smith and Lemstra, ibid. In this casting technique, polymer solution was prepared at 160° C. under nitrogen and was stabilized by 0.5% w/w of the antioxidant di-t-butyl-p-cresol. Upon quenching of the cast dilute solution, a polymer gel was generated. Solvent was allowed to evaporate at room temperature leaving an UHMW-PE film with a thickness of 0.14 mm containing 4% w/w of decalin. The last trace of the solvent was removed by extraction with ethanol.

The films reported by Smith and Lemstra apparently are porous although little is reported about the morphology of the porous structure. In addition, there are no reports of whether these films were permeable. The films produced were subjected to ultra-drawing in order to improve their mechanical properties. See Smith and Lemstra, ibid; Smith, P., Lemstra, P. J. and Booij, H. C., "Ultra-Drawing of High-Molecular Weight Polyethylene Cast From Solution. II. Influence of Initial Polymer Concentration", *J. Polym. Sci., Polym. Phys. Ed.*, 19, 877 (1981); and Matsuo, M. and Manley, R. S. J., "Ultra-Drawing at Room Temperature of High Molecular Weight Polyethylene", *Macromol.*, 15, 985 (1982).

A patented technique for forming porous structures, including sheets, from UHMW-PE is disclosed in U.S. Pat. No. 3,954,927 issued to Duling et al. In the Duling et al. patent, a method of forming a porous UHMW-PE structure is disclosed which comprises establishing a uniform heterogeneous composite of UHMW-PE particles and a hydrocarbon; forming the heterogeneous composite into an object of the desired shape; and subsequently heating the object to a temperature above the melting point of the polymer until the polymer particles have completely fused. The formed structure is cooled and the hydrocarbon is removed leaving a porous object. Although the Duling patent describes the production of porous articles, the technique is unconventional and limited in application.

Thus, despite the potential advantages offered by UHMW-PE as a material of fabrication for microporous membranes, particularly permeable microporous membranes, such advantages have not yet been realized. Permeable microporous membranes formed from UHME-PE have not been reported. Similarly, the use of conventional extrusion technology and/or equipment in the formation of UHMW-PE has not been reported.

DISCLOSURE OF THE INVENTION

This invention relates to novel and unique microporous membranes, which are formed from UHMW-PE, and a method for producing such membranes. In this method, UHMW-PE and a porogen are mixed and the mixture is heated to an elevated temperature to form a solution of UHMW-PE and porogen. This solution is extruded through a shaping die under moderate shear to form a membrane. Upon cooling, phase separation takes place in the membrane to produce a polymer-rich, porogen-poor phase and a polymer-poor, porogen-rich phase. A microporous structure is formed in the membrane by removing the porogen from the membrane and drying the microporous membrane.

Microporous membranes according to this invention include membranes having permeability to liquids and/or gases. Such permeable membranes can be used as filtration media and as water-resistant breathable materials.

Surprisingly, the method of the invention allows conventional extrusion equipment and/or techniques to be employed in the formation of microporous membranes fabricated from UHMW-PE. The invention also allows heretofore unrealized but potential advantages of UHMW-PE to be realized in microporous membranes, particularly microporous membranes which are permeable.

BEST MODE FOR CARRYING OUT THE INVENTION

The invention will now be described with particular reference to the Figures.

Figure 1:
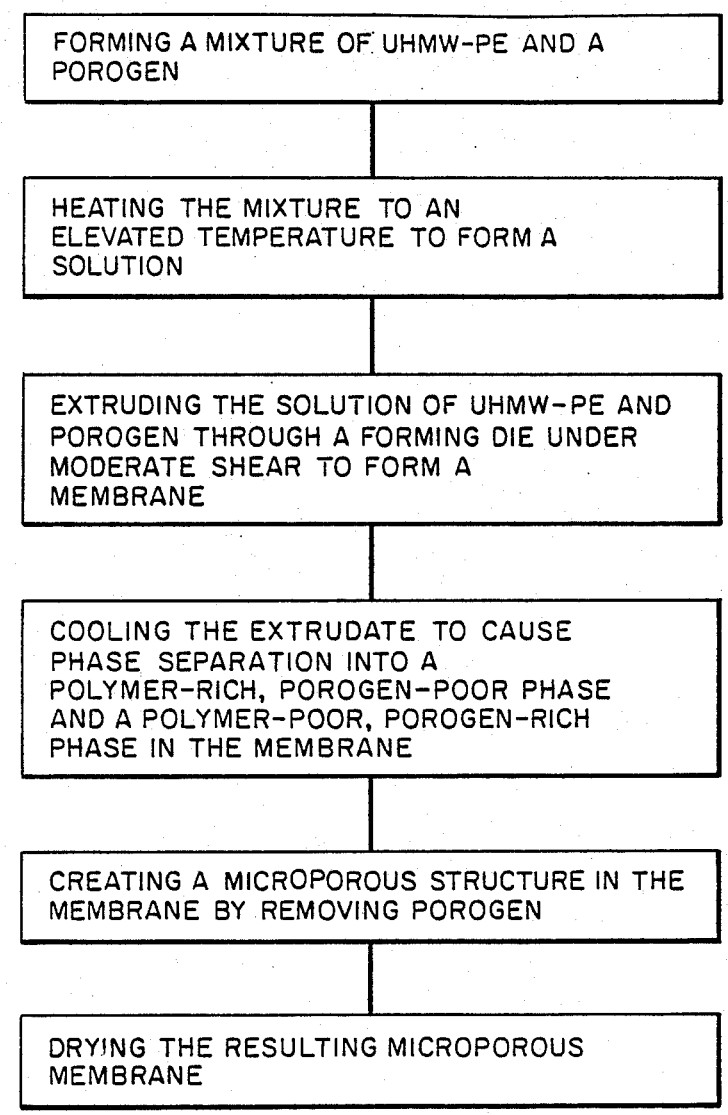
FIG. 1 is a block diagram generallly illustrating the steps in the method of this invention.

FIG. 1 illustrates generally the steps of the method according to this invention. As can be seen, the first step in the method is the formation of a mixture of UHMW-PE and a porogen.

There is no exact definition for UHMW-PE which is art-recognized. Typically, UHMW-PE is differentiated from other polyethylenes, such as high density polyethylene and low-density polyethylene, because it displays no measurable flow rate under normal test procedures. See Duling et al., U.S. Pat. No. 3,954,927. UHMW-PE also has significantly enhanced mechanical properties compared to other polyethylenes. These enhanced mechanical properties include abrasion resistance, impact resistance and toughness. Additionally, despite the lack of an exact definition, it is generally accepted that polyethylenes with a weight average molecular weight of 1 million and higher are included within the class designated as UHMW-PE. Such molecular weights correspond to an intrinsic viscosity in the range of about 8 or more. See Schwartz, S. S. and Goodman, S. H., *Plastics Materials and Processes*, Van Nostrand Reinhold Co., New York, N.Y. pp. 74–77 (1982).

Commercially, UHMW-PE is marketed as a white powder by several suppliers. American Hoechst, for example, markets an UHMW-PE powder under the trademark Hostalen GUR and Himont markets UHMW-PE powder under the trademark 1900.

Polymers other than UHMW-PE can be added to the mixture of UHMW-PE and porogen on an optional basis. As a general rule, the type and amount of such additional polymers should be limited so as not to detract significantly from the advantageous mechanical properties obtained by forming membranes from UHMW-PE.

Additionally, conventional or non-conventional additives also can be optionally added to the mix of polymer and porogen. Fillers, processing aids, anti-oxidants, stabilizers, pigments, surfactants, etc. can be added, as desirable.

The term porogen is employed herein to mean a material which can be mixed with UHMW-PE, heated to an elevated temperature to form a solution of porogen and polymer and subsequently cooled to create a mixture with a distinct phase rich in porogen and which phase can be removed from the mixture to create a microporous structure. Preferably, the porogen is a hydrocarbon, since hydrocarbons exhibit relatively good solvency for olefin polymers at elevated temperatures. Aliphatic, alicyclic and aromatic hydrocarbons can be employed as porogens.

Hydrocarbons which are liquid and which boil higher than the solution temperature are preferred. Either pure hydrocarbons, such as decane and higher homologues, or mixed hydrocarbons of the type normally found in petroleum fractions, such as kerosene, fuel oil and the like can be used. Mineral oil is a particularly preferred porogen.

Hydrocarbons which are solids at ambient temperatures, such as paraffin wax, can also be used as porogens if they meet the criterion of being a liquid solvent for the polymer at elevated temperatures.

In addition to the hydrocarbons set forth as being preferred porogens, polar solvents also can be employed. Examples are dioctylphthalate, dibutylsebacate and halogenated compounds such as hexabromobiphenyl.

It is only necessary that the porogen form a solution on the macroscopic scale. Porogens which leave residual undissolved fractions which can be seen only on a microscopic level are suitable.

When the porogen is a liquid at room temperature, a dispersion or slurry can be formed by adding UHMW-PE polymer powder into the liquid and mixing the two. On the other hand, if the porogen is a solid at room temperature, a powder mix can be formed by mixing finely ground solid porogen with UHMW-PE powder.

It has been found that mixtures containing more than about 20% UHMW-PE, by weight, produce solutions which are difficult to process at practical rates because of their high viscosities. On the other hand, mixtures containing below about 2% UHMW-PE, by weight, produce solutions having melt strengths so low that processing of the extruded membrane is difficult. In addition, mixtures containing below about 2% UHMW-PE, by weight, result in microporous membranes in which much of the microporous structure collapses. Collapse of the microporous structure results in a decrease of the permeability of the membranes. Amounts of UHMW-PE between about 5% and 15%, by weight, are preferred because such amounts result in extruded membranes which can be readily processed with conventional equipment to produce microporous membranes having outstanding properties.

The mixture of UHMW-PE and porogen is heated to an elevated temperature to form a solution. The exact temperature required to dissolve the UHMW-PE will depend upon the molecular weight of the UHMW-PE, the porogen, and the concentration of polymer present. In general, temperatures of about 200° C. or more have been found suitable.

The UHMW-PE solution is extruded through a forming die in order to form a membrane. The forming die can be selected to produce films, hollow fibers, or other membrane shapes. Slot dies and blown film dies have both been employed to form films suitable for production of microporous membranes.

Forming is done under moderate shear. Previously, the art has recognized that UHMW-PE is very susceptible to degradation by shear. See, for example, the teachings of Duling et al., U.S. Pat. No. 3,954,927. On the other hand, it has been found that some shear is necessary to provide sufficient mixing for uniform heat distribution across the polymer and to allow more mixing and interpenetration of the components during processing. The appropriate amount of shear is an amount sufficient to form, in the extrusion apparatus, a homogenous solution of polymer in porogen so that membranes can be extruded which do not contain defects, such as holes and bubbles and which have good strength. However, the amount of shear should be below an amount which significantly degrades the mechanical properties of UHMW-PE. The amount of shear desired is referred to herein as "moderate" shear.

The amount of shear to which the solution being extruded is subjected can be controlled as follows. The shear rate applied to the solution is a function of the design of the extrusion system. In particular, the screw speed and the gap between the screw and barrel wall of the extruder contribute to the shear rate. If more than one screw is employed in the extruder, such as in twin-screw extruders, the shear rate is also affected by the distance between the screws, the design of the screws, and their rotational relationship, i.e., corotating or counter-rotating. Thus, the shear rate can be adjusted by appropriate selection or modification of these extruder parameters.

In addition, the amount of shear can be lessened by reducing the residence time of the polymer mixture and solution in the extruder. For example, the barrel of the extruder can be shortened to reduce the residence time for polymer mixture and solution.

After the solution has been extruded through a die to shape it into a membrane, the membrane is cooled to a temperature sufficient to cause phase separation in the membrane. Such cooling results in a polymer-rich, porogen-poor phase and a distinct polymer-poor, porogen-rich phase within the membrane.

Cooling is carried out at or below the phase separation temperature. Typically, temperatures of below about 100° C. have been employed.

The cooling rate of the extruded membrane can also affect the ultimate membrane structure produced. In general, slower cooling rates tend to provide larger pores in the microporous membranes and increased gas and liquid permeability. The length of time the extruded membrane is maintained under cooling conditions also affects the ultimate structure and properties of the microporous membrane produced.

One suitable cooling technique involves immersion of the extruded membrane in a cooling bath of liquid. The liquid might be, for example, water maintained at a suitable temperature. Alternatively, cooling gas such as air, can be directed at the extruded membrane to cool it. Still yet another alternative cooling technique involves bringing the extruded membrane into thermal contact with chill rolls or other solid surfaces maintained at cooling temperatures.

After sufficient cooling to create two phases, a microporous structure in the membrane is created by removing porogen. A preferred way for removing porogen is by extraction. Extraction can be achieved by immersing the membrane in a bath of suitable extractant liquid, such as hot ethanol, or hexane.

Still yet another method for removing porogen is by sublimation. For example, naphthalene might be employed as a porogen and subsequently removed from a two-phase polymer porogen system by heating to sublime the naphthalene.

Because the membrane generally shrinks during porogen removal, it is preferred to restrain the membrane during porogen removal. Such restraint can be employed to minimize dimensional change in the membrane as well as to minimize collapse of the microporous structure.

The experimental work described herein indicates that the specific porogen employed can have a significant effect on the morphology and properties of the ultimate microporous membrane produced. For example, it has been found that use of the porogen mineral oil tends to result in a lacy open-type structure in the microporous membrane produced. This is desirable for liquid and gas permeability. On the other hand, use of the porogen dioctylphthalate appears to result in a cellular structure in the microporous membrane. Such a cellular structure is desirable for thermally insulating membranes and carriers for controlled release.

After porogen removal, the microporous membrane is dried to remove any remaining extractant. This can be done at ambient temperature or by exposing the membrane to elevated temperatures. At elevated temperatures, the microporous membranes can also be strengthened. Temperatures of up to about 130° C. have been found to be suitable.

It is also preferred to restrain the membrane during drying to minimize dimensional changes and/or collapse of the microporous structure.

Figures 2, 3, 4:
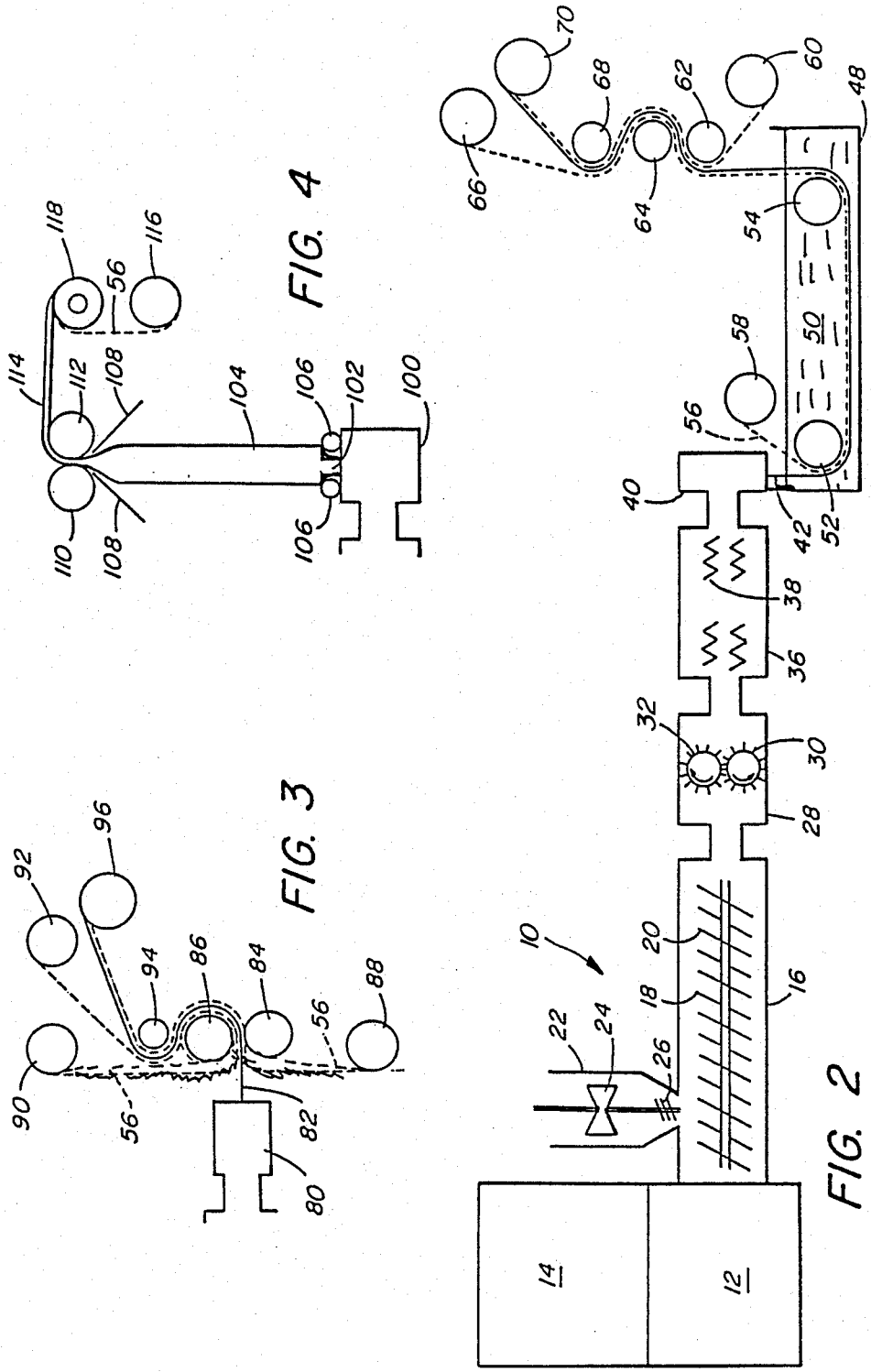
FIG. 2 is a schematic diagram illustrating an arrangement of equipment suitable for use in practicing one embodiment of the method described herein.
FIG. 3 is a schematic illustration of an alternative arrangement of equipment for practicing an alternative embodiment of the invention described herein.
FIG. 4 is a schematic illustration of yet another alternative arrangement of equipment for practicing still yet another alternative embodiment of the invention described herein.

One embodiment of a suitable extrusion system employed in practicing the method of this invention is illustrated in FIG. 2. Extruder 10 comprises a drive/control console 12, temperature/pressure control console 14, extruder barrel 16 with twin screws 18, 20 therein and feed hopper 22. Drive/control console 12 includes a motor for driving twin screws 18, 20, screw speed controller, torque readout indicator and screw speed readout indicator. Temperature/pressure control console 14 contains temperature controllers and temperature readout indicators and a pressure readout indicator.

A mixture of polymer and porogen, such as a 10% slurry of UHMW-PE in mineral oil, is introduced into feed hopper 22 and is kept well dispersed by mixer 24. Slurry is fed to screws 18, 20 by gravity aided feed screw 26.

Twin screws 18, 20, the gap between the two screws, the gap between the screws and extruder barrel 16 and the L/D ratio of the extruder barrel 16 are designed to avoid excessive shear but to create a moderate amount of shear as the slurry passes through barrel 16. Barrel 16 is heated to a temperature sufficient to melt polymer in the slurry and to reach the solution temperature. Thus, extruder 10 provides melting of the polymer, mixing of the polymer and porogen to form a solution, and pumping of the solution. with a low L/D ratio, the slurry and solution of polymer and porogen have a relatively short residence time under shearing conditions in barrel 16.

Solution exiting from barrel 16 passes to gear pump 28. Gear pump 28 contains metering gears 30, 32 which provide a buildup of pressure and accurate metering of solution.

Solution leaving gear pump 28 is directed into static mixer 36, which is optional. Irregularly shaped baffles 38 provide a tortuous path in mixer 36 which aids in achieving a high degree of mixing. Thus, static mixer 36 provides additional low-shear mixing and solution uniformity and increase the residence time at elevated temperature of the solution of polymer and porogen.

The solution is extruded through vertical exiting slot die 40 which has an adjustable gap. Extruded membrane 42 exiting from vertical slot die 40 is directed through a quenching bath 48 of cooling liquid 50. Suitable cooling liquid might be, for example, water maintained at a temperature of about 45° C. Extruded membrane 42 is directed through cooling fluid 50 by guide rolls 52, 54. Protective paper 56, fed from paper feed roll 58, is brought into contact with the upper surface of extruded membrane 42 at the point of contact with guide roll 52. Protective paper 56 fed from paper feed roll 60 is brought into contact with the lower surface of extruded membrane 42 at the point of contact with take-up rolls 62, 64. The upper layer of protective paper 56 is removed and wound up on roll 66. Extruded cooled membrane 42, contacted on its lower surface with protective paper 56, is passed over guide roll 68 and wound up onto membrane wind-up roll 70.

Material other than paper could be employed to protect the surface of the extruded membrane. For example, other nonwoven or woven materials are suitable. In general, the protective material should have a fairly rough surface.

It is important to minimize the shear rate at vertical slot die 40. This can be done by maintaining a sufficiently wide gap to prevent excessively high shear in the extrudate. Excessively high shear has been found to cause melt fracture and macroporous holes, apparently because of the very high molecular weight of the polymer.

It is also important to maintain a sufficiently high temperature at vertical slot die 40 to produce high quality membranes. For example, for 10% slurry of UHMW-PE and mineral oil, it has been found that it is preferred to maintain the temperature of the vertical slot die be above about 160° C. in order to produce high quality membranes. Below such a temperature, the flow is generally inadequate for satisfactory extrusion.

On the other hand, too high a temperature at the slot die produces defects in the membrane produced. Such defects include slits and tears in the membrane. For a 10% slurry of UHMW-PE and mineral oil, it has been found it is preferred to maintain the die temperature below about 220° C.

Take-up rolls 62 and 64 establish the rate of take-up. Faster take-up provides more drawdown or stretching of the membrane. Experimental work indicates that minimum drawdown for membranes extruded through a slot die is desirable. Thus, it is preferable to have a drawdown ratio of about 1:1. Much faster drawdown has been found to produce slits, holes, edge tears and other deformities in the extruded membranes or microporous membranes produced after extraction and drying.

FIG. 3 illustrates an alternative embodiment of a suitable extrusion die, cooling system and take-up system for use in practicing this invention. In this embodiment, solution is extruded through a horizontal exiting slot film die 80. Extruded membrane 82 is brought into thermal contact with chrome-plated chill rolls 84, 86 which can be cored for thermal liquid temperature control. Protective paper 56 is directed from paper feed rolls 88 and 90 and brought into contact with the lower and upper surfaces, respectively, of extruded membrane 82. Chill rolls 84 and 86 are positioned closely to die 80, such as within 1-2 inches, to minimize width reduction in membrane 82. Protective paper 56 is removed from the upper surface of membrane 82 and wound onto take-up roll 92. Membrane 82 contacted on its lower surface with protective paper 56 passes over guide roll 94 and wound onto membrane wind-up roll 96.

FIG. 4 illustrates yet another embodiment of an apparatus suitable as an extruding die, cooling system and takeup system for use with this invention. Therein, blown film die 100 is positioned to produce a thin tube 102 exiting from die 100 in a vertical direction. Blown film die 100 contains an annular opening, and the polymer solution is extruded through this annulus. Simultaneously, air or other gas is blown on the inside of tube 102 to expand it into an extrudate membrane bubble 104. Cooling air is blown on the outside of extruded tube 102 by air ring 106. This provides a slower rate of cooling than either the chill rolls or quenching baths previously illustrated due to the lower heat transfer coefficient of air or other cooling gas.

It has been found to be preferred to maintain the blown film die at a temperature of at least about 185° C. to produce high quality membranes employing a 10% slurry of UHMW-PE in mineral oil.

Extruded membrane bubble 104 is directed by guides 108 to nip rolls 110, 112 which collapse extrudate membrane bubble 104 producing collapsed membrane tube 114. Protective paper 56 is fed from supply roll 116 to the lower side of collapsed membrane tube 114 and both are wound up on wind-up roll 118.

It is preferred to keep the extruded blown membrane bubble 104 in a somewhat stretched condition to prevent syneresis or exudation of the liquid porogen. This can be done, for example, by extruding tube 102 in the vertical direction while taking up collapsed tube 114 at respective velocities to provide a drawdown ratio of about 1:1.5.

Removal of porogen is done after the membrane has been extruded and cooled to provide suitable phase separation. The time between cooling and the extraction process does not appear to be particularly critical.

As indicated above, removal of porogen is done by art-recognized techniques, such as by extraction in a liquid extracting medium or by sublimation.

It is preferred to restrain the membrane during porogen removal, and also during drying. This can be done by clamping or otherwise restraining the membrane. Typically, the restrained membrane is immersed in an extractant, such as hot ethanol, or hexane at room temperature, to extract porogen.

Typically, a total extraction time of about 2 hours has been found to be sufficient to achieve complete porogen removal. It is believed, however, that shorter times would also be suitable in many cases. Preferably, extractant liquid is changed one or more times during this period to maintain fresh extractant liquid.

After extraction, the frame and membrane are removed from the extractant bath and dried. Drying can be achieved in ambient air or by placing the restrained membrane in a hot air oven. Exposure to 70° C. for about 30 minutes has been found to be sufficient to remove excess extractant. Use of higher drying temperatures, such as about 125° C., also provides additional strengthening to the UHMW-PE microporous membrane.

Microporous membranes can be produced according to this invention which are permeable to liquids and gases. It should be noted that a microporous structure is not necessarily a permeable structure. For example, a microporous structure may have pores which are not interconnected sufficiently to provide permeability or may have a dense skin on one or both outer surfaces which also make the membrane non-permeable.

Figure 5:
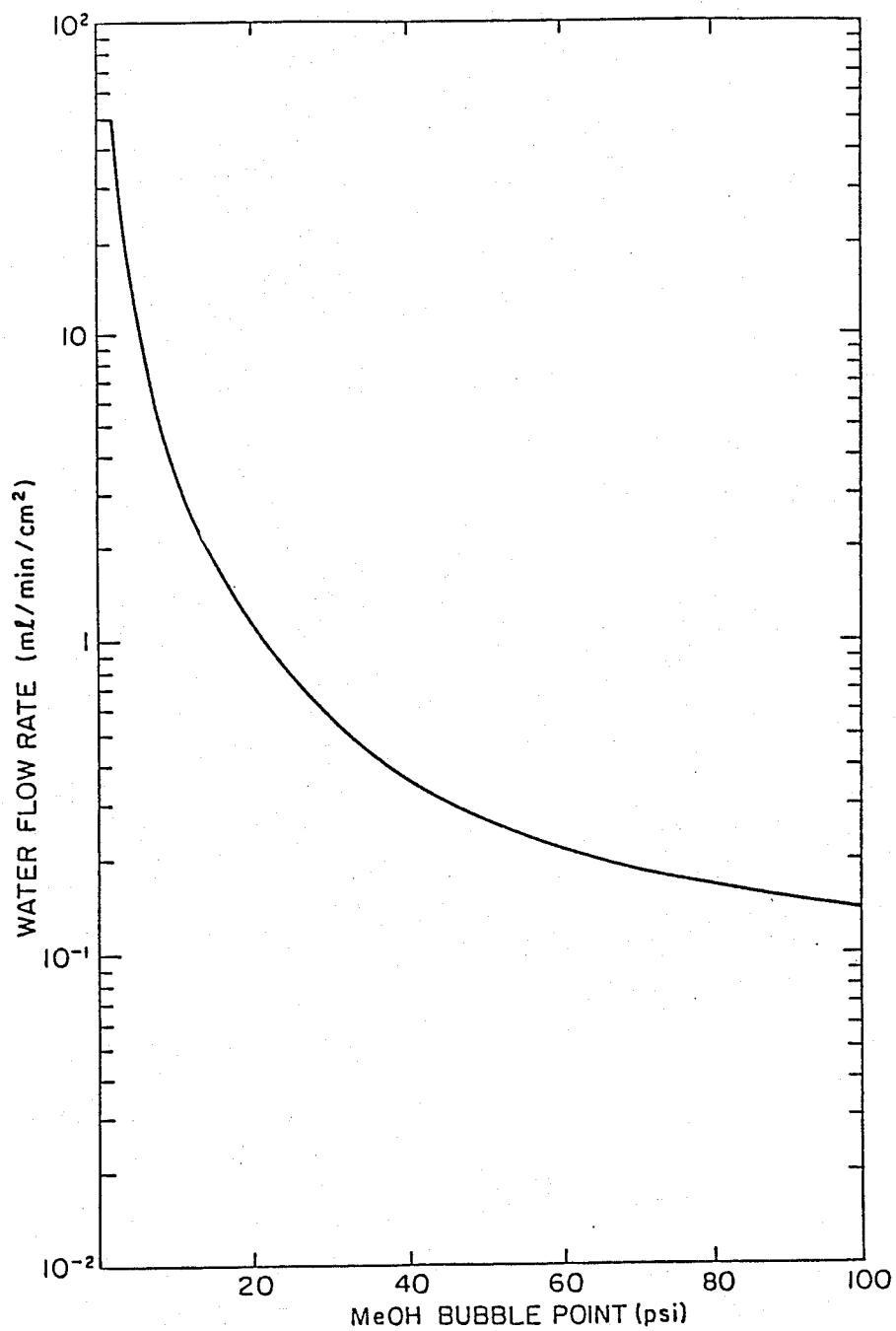
FIG. 5 is a plot of minimum water flow rate for a permeable microporous membrane plotted as a function of methanol bubble point.

In FIG. 5, a projected curve of water flow rate of a useful permeable microporous membrane is plotted as a function of its methanol (MeOH) bubble point. Both parameters are measurable quantities of permeable microporous membranes and the specific methods employed in determination of these values herein are set forth below in the Examples.

The MeOH bubble point is a measure of the maximum pore size in a permeable membrane determined by employing MeOH as the wetting liquid. Other wetting liquids can be used so long as their surface tensions are low enough to wet the membrane sample. MeOH is commonly used for hydrophobic membranes because of its low surface tension.

The relationship between bubble point and pore size is often expressed by the Washburn equation:

$$P = (4\gamma \cos \theta)/d$$

where P = Bubble point pressure
$\gamma$ = Surface tension of wetting liquid
$\theta$ = Liquid-solid contact angle
d = Maximum pore diameter.

Strictly speaking, this equation is applicable only for cylindrically shaped capillary pores. However, efforts have been made to modify it by placing an additional pore shape correction factor in the equation. Thus, it does provide a means of comparing maximum pore size, on a relative basis, among permeable membranes of the same structural type. The bubble point pressure can also be used to provide knowledge of the relative retention capability of these membranes.

In order for a microporous membrane to have practical utility as a filtration medium, it must possess, in addition to its retention capability, reasonable permeability for the filtrate. Permeability is often measured as pure water or other liquid flow rate through the membrane's thickness under a certain applied differential pressure. One of the inherent factors in the membrane which can affect permeability is its average pore size. However, since average pore size is not easily obtainable for a membrane, water flow rate is often plotted as a function of bubble point (maximum pore size) to show an empirical relationship between these two parameters. For a microporous membrane family of the same structural type, and with a reasonably uniform distribution of pore size in each membrane of a certain bubble point, a curve such as in FIG. 5 can be obtained. Such a curve demonstrates that water flow rate increases continuously with decreasing bubble point (increasing maximum pore size) when other factors are held constant.

A nonuniform membrane with a few large pores among a matrix of smaller pores would show a low bubble point and a relatively low water flow rate. It would have poor retention capability, and with its low permeability, it would be unsuitable for filtration application. Such a membrane would fall below the curve of FIG. 5.

Other factors in the membrane that can affect the water-flow rate are porosity and thickness. In general, the higher the porosity, the higher the flow. The effect of thickness is dependent on the isotropy of the membrane structure. If the porous structure is isotropic throughout the membrane, flow rate is usually inversely proportional to thickness. For an anisotropic structure, flow rate is governed by the thickness of the section where porosity and/or pore size is limiting.

The range of MeOH bubble point plotted on FIG. 5 is limited to bubble points between about 1 and about 100 psi. This defines the range of pore sizes considered suitable for fine filtration media. In addition, filtration media should be based upon membranes having thicknesses of less than about 250 $\mu$m and should have porosities of at least about 50%. Membranes suitable as filtration media should not contain macroscopic holes or tears and should maintain sufficient mechanical integrity during handling, assembly and use.

Microporous membranes of this invention can have outstanding mechanical properties since they are comprised of UHMW-PE. For example, unsupported membranes can have tensile strengths above 500 psi; an elongation at break above 100%; and a melting point above 132° C. Such tensile strengths and elongations result in robust tough membranes. The high melting points allow commercial sterilization by autoclaving which is desirable in many medical and pharmaceutical operations.

In addition to filtration media, another significant use for permeable microporous membranes of this invention is water-resistant breathable microporous materials. Permeability can be expressed in terms of air flow with a minimum of 0.1 lit/min/cm$^2$ at 10 psi differential pressure being suitable. Water-resistant properties can be expressed as minimum water intrusion pressures of about 2 psi. Techniques for determining air flow and minimum water intrusion pressure are described below in the Examples.

Figure 6A:
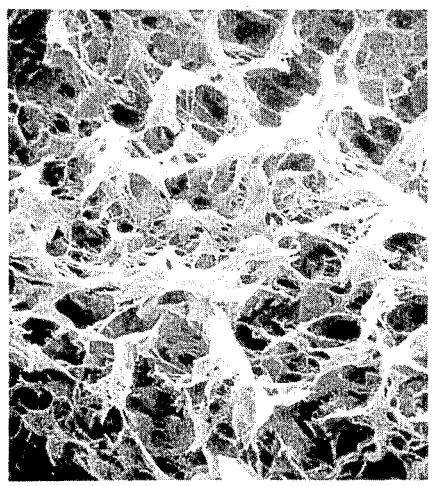
FIGS. 6A, 6B, 6C and 7 are scanning electron photomicrographs of microporous membranes produced according to the method of this invention.
Figure 6B:
Figure 6C:
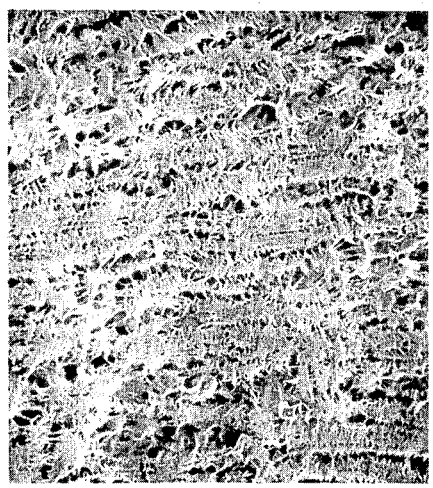
Figure 7:
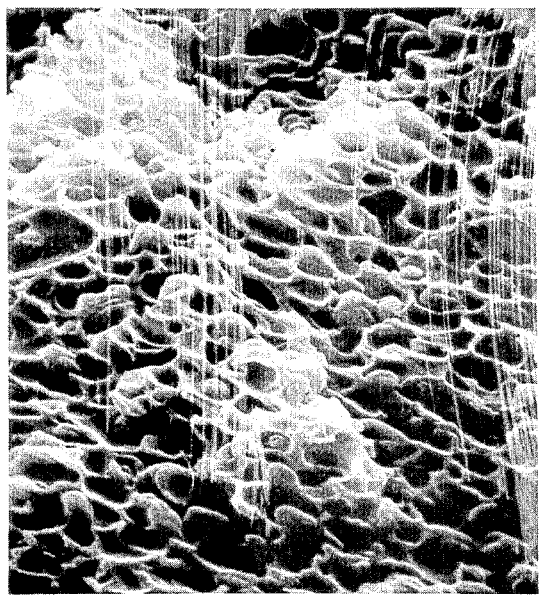

FIGS. 6 and 7 are scanning electron photomicrographs of membranes produced by methods described herein. The cross sections are of samples of membrane fractured in liquid nitrogen.

The photomicrographs shown in FIG. 6 are of a cross-section (FIG. 6A), side one (FIG. 6B) and side two (FIG. 6C) of a permeable microporous membrane produced by the procedure of Example 3, below. It has a lacy structure in its cross section and a stringy structure on its surfaces, usually referred to in the literature as shishkebab. Such a lacy structure is desirable for high permeability.

The sample employed for FIG. 7 was produced using dioctylphthalate as a porogen and procedures similar to Example 1, below. This sample has an entirely different morphological structure, i.e., a cellular structure is evident.

The invention will now be more specifically described by the following examples.

EXAMPLE 1

PERMEABLE MICROPOROUS UHMW-PE MEMBRANE PRODUCED BY EXTRUSION THROUGH A SLOT DIE INTO A WATER BATH

A 10% (w/w) dispersion of UHMW-PE (Himont 1900 resin) in mineral oil was prepared at room temperature and used for membrane extrusion. The polymer was in powder form and its $M_w$ exceeded $3 \times 10^6$. The mineral oil used had a viscosity of 60 cst (40° C.) and a specific gravity of 0.88 (25° C.).

The dispersion was fed into an extruder system as illustrated in FIG. 2. This system included an Electronic Plasti-Corder, Model EPL-V5501; temperature control console Model 2505; screw feed hopper assembly; and twin screw mixer extruder with 42 mm slotted counterrotating screws all marketed by the C. W. Brabender Company. A Nichols Zenith gear pump, type HPB-0.584 cc/rev., was employed. The L/D ratio of the extruder was 6.

The temperature of the extruder heating zones and the metering pump was set at 220° C. A 15 cm wide vertical-exiting slot die with a gap opening of 150 µm was used with its temperature maintained at 180° C. The pump speed was set to provide an extrudate output of 5 gm/min. The membrane was extruded directly into a water quench bath maintained at 45° C. The take-up speed was adjusted such that the quenched membrane was approximately 100 µm in thickness and 12 cm in width. The sample was rolled up with a single paper interleaf.

To extract the mineral oil from the quenched membrane, a length of the sample was cut and mounted in an open rectangular frame. The membrane was clamped in the frame to minimize shrinkage and collapse of the microporous structure. The framed sample was placed in an excess vol. of hot ethanol (~70° C.) for extraction. The ethanol was changed once during extraction. Total extraction time was approximately 2 hours. The restrained sample was then dried in a convection oven at 70° C. for 30 minutes.

The sample was tested for its permeability, water intrusion and tensile properties. The results are shown below.

| | |
|---|---|
| Porosity = | 73% |
| Thickness = | 90 µm |
| Air Flow Rate = | 0.54 lit/min/cm² |
| Water Flow Rate = | 4.5 ml/min/cm² |
| MeOH Bubble Point = | 26 psi |
| Water Intrusion Pressure = | 90 psi |
| Tensile Strength = | 1312 psi (MD) |
| | 995 psi (TD) |
| Elong. at Break = | 368% (MD) |
| | 826% (TD). |

Porosity is expressed as the percentage of void volume in a sample. It was determined by measuring the density of a sample and then comparing that density to the density of the polymer in its nonporous solid form.

Air flow rate is measured on a dry 47 mm diameter membrane sample by applying a differential air pressure of 10 psi on the upstream side of the sample. Exit pressure is set at atmospheric pressure. A mass flow meter is used to determine air flow, which is corrected to 20° C. and one atmosphere.

Water flow rate was determined by ASTM Test No. F317-72. In general, a 47 mm diameter sample was wet with methanol and placed onto a filter holder set in a vacuum flask underneath the holder. 250 ml. of filtered water at 25° C. was then poured on the wet membrane and vacuum of 27 inches of Hg was applied to the bottom of the membrane. The time for 250 ml of water to pass through the sample was measured and water flow rate of the membrane was calculated.

Water intrusion pressure was determined with a dry membrane sample on a filter holder and a short column of water at 25° C. on it. The downstream side was open to atmospheric pressure. Increasing pressure was applied to the top of the water column and the flow rate of water through the membrane was measured as a function of applied pressure. The extrapolated pressure to zero flow was taken as the water intrusion pressure. In other words, this is the pressure differential below which water can not pass through an initially dry membrane.

The tensile strength and elongation at break were measured on an Instron Tensile Tester using a cross head speed of 2" per minute and a sample size of $" \times 2\frac{1}{2}"$. Tensile strength and elongation at break were measured in the longitudinal or machine direction (MD) and in the transverse direction (TD).

Methanol bubble point was determined by ASTM Test No. E128-61. In general, a membrane sample was wetted with methanol and placed on a filter holder. Methanol was placed on top of the wet sample and air pressure was applied to the underside of the sample. The bubble point pressure was recorded as the pressure when the first stream of small bubbles appeared in the liquid reservoir on top of the membrane.

EXAMPLE 2

PERMEABLE MICROPOROUS UHMW-PE MEMBRANE PRODUCED BY EXTRUSION THROUGH A SLOT DIE ONTO A CHILL ROLL

The dispersion mixture and extruder system of Example 1 were employed except that a static mixer in line after the melt pump and an horizontal-exiting slot die with a 15 cm slot were employed. Extruded membrane was brought into thermal contact with chill rolls as illustrated in FIG. 3.

The temperature was set at 220° C. for the extruder screw, metering pump and Koch, Model KMB-100, static mixer with the die temperature set at 160° C. The extruded membrane was sandwiched between two moving paper belts just before touching the first chill roll to prevent surface smearing. The temperature of the rolls was controlled at 50° C. by passing thermostated liquid through the cores. Extrudate output was 5 gm/min and the take-up speed used gave a membrane 45 μm in thickness and 14 cm in width. The sample was rolled up with a single paper interleaf.

A sample was clamped as in Example 1 and extracted by placing it in an excess volume of hexane at room temperature. The hexane was changed once during extraction. Total extraction time was approximately 2 hours and the restrained sample was dried at 70° C. for 30 minutes. Properties of this sample were as follows:

| | |
|---|---|
| Porosity = | 79% |
| Thickness = | 40 μm |
| Air Flow Rate = | 0.63 lit/min/cm$^2$ |
| Water Flow Rate = | 5.2 ml/min/cm$^2$ |
| MeOH Bubble Point = | 26 psi |
| Water Intrusion Pressure = | 90 psi |
| Tensile Strength = | 1461 psi (MD) |
| | 972 psi (TD) |
| Elong. at Break = | 197% (MD) |
| | 323% (TD). |

EXAMPLE 3

PERMEABLE MICROPOROUS UHMW-PE MEMBRANE EXTRUDED THROUGH A BLOWN FILM DIE

The dispersion mixture of Example 1 was fed into the extruder system of Example 2 but having a 2.5 cm blown film die as illustrated in FIG. 4. Air was used for expansion and quenching of the extrudate. The temperature was set at 220° C. for the extruder, metering pump and static mixer, while the die was at 200° C. Output was maintained at 10 gm/min. Air pressure and take-up speed were adjusted to give an extrudate bubble of approximately 6 cm in diameter and film thickness of about 25 μm. The bubble was collapsed through a pair of nip rolls and collected on a wind-up roll.

The sample was clamped as in Example 1, extracted in hexane and dried as in Example 2. Properties of this sample were as follows:

| | |
|---|---|
| Porosity = | 78% |
| Thickness = | 15 μm |
| Air Flow Rate = | 1.03 lit/min/cm$^2$ |
| Water Flow Rate = | 10.4 ml/min/cm$^2$ |
| MeOH Bubble Point = | 33 psi |
| Water Intrusion Pressure ≈ | 100 psi |
| Tensile Strength = | 1659 psi (MD) |
| | 1622 psi (TD) |
| Elong. at Break = | 160% (MD) |
| | 552% (TD). |

EXAMPLE 4

EFFECT OF RESTRAINING MEMBRANE DURING EXTRACTION AND DRYING

To illustrate the importance of restraining a membrane during porogen extraction and drying, unextracted samples from Examples 1 (4-1) and 2 (4-2) were extracted in hot ethanol and room temperature hexane, respectively, and dried without restraint. Extraction time and drying conditions were otherwise the same as in Examples 1 and 2. The porosity, thickness, shrinkage and water permeability of each sample were measured and were as follows:

| Sample | Thickness (μm) | Porosity (%) | Shrinkage (% reduction in area after extraction and drying) | Water Flow Rate (ml/min/cm$^2$) |
|---|---|---|---|---|
| 4-1 | 105 | 48 | 61 | <0.15 |
| 4-2 | 55 | 64 | 54 | 0.45. |

EXAMPLE 5

STEAM STERILIZATION OF A PERMEABLE MICROPOROUS UHMW-PE MEMBRANE

This example illustrates the effect of steam sterilization (autoclaving) on shrinkage and permeability of an UHMW-PE microporous membrane.

An extruded sample prepared as in Example 1 was extracted restrained in hexane at room temperature for 2 hours and dried in a convection oven at 125° C. for 2 hours. Part of the dried sample was then sealed unrestrained inside a paper envelope and steam sterilized in a commercial scale autoclave at 126° C. for a 45 minute cycle. The sample experienced a shrinkage of approximately 6% in area. It retained its white appearance with no sign of pore collapse. The water and air flow rates of the sample were also measured and compared with those before autoclaving. The results were:

| | Water Flow Rate (ml/min/cm$^2$) | Air Flow Rate (lit/min/cm$^2$) |
|---|---|---|
| Before Autoclaving | 7.4 | 1.34 |
| After Autoclaving | 7.2 | 1.20. |

The water and air flows showed only slight differences before and after autoclaving. The increase in water and air flows of the sample in this example before autoclaving compared to the sample of Example 1 is probably due to the higher drying temperature used in this Example.

EXAMPLE 6

COMPARISON OF PROPERTIES OF PERMEABLE MICROPOROUS UHMW-PE MEMBRANES WITH A HIGH DENSITY POLYETHYLENE MICROPOROUS MEMBRANE AND COMMERCIALLY AVAILABLE MICROPOROUS MEMBRANES

Certain mechanical and physical properties of two UHMW-PE microporous membranes made according to this invention were compared to corresponding properties of a high density polyethylene microporous membrane and commercially available microporous membranes. One UHMW-PE membrane was formed with a slot casting die according to the method of Example 1. The other UHMW-PE membrane was prepared by extrusion through a blown film die according to the procedures of Example 3.

One membrane employed for comparison was fabricated from high density polyethylene (HDPE) as follows. A mixture of 15% (w/w) HDPE pellets (American Hoechst Hostalen GM 5010T2N) in mineral oil (viscosity=60 cst at 40° C. and specific gravity=0.88 at 25° C. was heated to 160° C. and stirred in a glass mixing vessel under nitrogen until a one phase solution was formed. The solution was cooled and allowed to solidify. The mixture was then cut into small pieces and used for thin film extrusion by a method similar to that described in Example 1.

The mixture was gravity fed into the extruder through the hopper, without the use of mixer or feed screw. The temperature of the extruder screws, metering pump and the vertical exiting die were at 180°, 180°, 180° and 150° C. respectively. The extrudate output was 10 gm/min and the water quench bath temperature was 15° C. The extruded film thickness was approximately 155 μm. The extraction and drying procedures were the same as in Example 1.

Other membranes employed for comparison included: a 0.2 μm (pore size) polytetrafluoroethylene membrane marketed by Gore under the trademark Gore-Tex; and a 0.2 μm (pore size) poly(vinylidene fluoride) membrane sold commercially by Millipore Corporation, Bedford, MA under the trademark "Durapore".

The results were:

TABLE 1

| Microporous Sample | Porosity (%) | MeOH B.P. (psi) | Thickness (μm) | Water Flow Rate (ml/min/cm$^2$) | Air Flow Rate (lit/min/cm$^2$) | Water Intrusion Pressure (psi) | Water Vapor Transmission (g/hr/cm$^2$) | Tensile Strength (psi) | Elong. at Break (%) | Melt Temp. (°C.) |
|---|---|---|---|---|---|---|---|---|---|---|
| UHMW-PE (Ex. 1) | 73 | 26 | 90 | 4.5 | 0.54 | 90 | $2.5 \times 10^{-3}$ | 1312 (MD) 995 (TD) | 368 (MD) 826 (TD) | 138 |
| UHMW-PE (Ex. 3) | 78 | 33 | 15 | 10.4 | 1.03 | 100 | $2.5 \times 10^{-3}$ | 1659 (MD) 1622 (TD) | 160 (MD) 552 (TD) | 136 |
| HDPE | 78 | 15 | 135 | 9.0 | 0.73 | 50 | $2.5 \times 10^{-3}$ | 109 (MD) 90 (TD) | 109 (MD) 103 (TD) | 126 |
| 0.2 μm PTFE Gore-Tex | 67 | 19 | 50 | 19.5 | 1.17 | 60 | $2.5 \times 10^{-3}$ | 2081 (MD) 3786 (TD) | 384 (MD) 111 (MD) | 325 |
| 0.2 μm PVDF Durapore | 67 | 18 | 120 | 15.3 | 0.90 | 35 | $2.5 \times 10^{-3}$ | 871 (MD) 765 (TD) | 37 (MD) 38 (TD) | 169 |

Water vapor transmission (WVT) was determined by ASTM Test No. E96-80 employing the cup method. In general, WVT was obtained by sealing a membrane over a container of water and placing the container and membrane at room temperature and humidity (approximately 21° C. and 65% R.H.). The weight loss over a period of time was then determined and used as a measure of the water vapor transmission through the membrane.

The melting temperature was measured using a differential scanning calorimeter and employing a heating rate of 10° C. per minute. The peak of the endotherm was taken as the melting temperature.

EXAMPLE 7

COMPARATIVE PROPERTIES OF PERMEABLE MICROPOROUS UHMW-PE MEMBRANE WITH COMMERCIALLY AVAILABLE SINTERED UHMW-PE MEMBRANES

Certain properties of the UHMW-PE microporous membrane prepared as in Example 1 were compared to the corresponding properties of 20 μm pore size UHMW-PE film sold commercially by Porex. The Porex membrane is believed to be made by a sintering technique. The results were as follows:

| | Example 1 | Porex |
|---|---|---|
| Air Flow Rate (lit./min/cm$^2$) | 0.54 | 34 |
| Porosity (%) | 73 | 52 |
| Tensile Strength (psi) | 1312 (MD) 995 (TD) | 142 |
| Elong. at Break (%) | 368% (MD) 826% (TD) | 50 |
| MeOH Bubble Point (psi) | 26 | <0.5 |

-continued

| | Example 1 | Porex |
|---|---|---|
| Water Intrusion Pressure (psi) | 90 | <0.5 |

EXAMPLE 8

COMPARATIVE PROPERTIES OF PERMEABLE MICROPOROUS UHMW-PE MEMBRANE WITH MEMBRANE PRODUCED ACCORDING TO DULING ET AL., U.S. Pat. No. 3,954,927

A sample of a 10% (w/w) dispersion of UHMW-PE (Himont 1900 resin) in mineral oil from Example 1 was vacuum degassed at room temperature in a vacuum oven for 1 hour.

The dispersion was doctored onto a flat stainless steel plate of size 20 cm×20 ×0.32 cm using a Gardner casting knife with a gap setting of 1000 μm. The steel plate was placed on a preheated heating platen of a Carver press. The temperature of the platen was set at 190° C. It was observed the mineral oil in the dispersion tended to separate out initially to form pockets of clear regions among more translucent regions of concentrated dispersion. In other words, the dispersion appeared to have become non-uniform when heat was first applied.

It took approximately 120 seconds to observe a change in the surface reflectivity of the sample to a dull appearance, indicating the resin was melting in the mineral oil and being solubilized. An additional 100 seconds of heating time after this point was allowed.

The sample with the steel plate was removed from the heating platen and was cooled by running cold tap water against the back side of the plate for approximately 2 minutes. The gel-like film sample was removed from the plate by peeling. A razor blade was used to start the separation at one corner of the plate. The sample was then mounted onto an open rectangular frame and clamped by the edges. The framed sample was immersed in an excess volume of hexane at room temperature for extraction. Total extraction time was approximately 2 hours with the hexane changed once during this process. The sample was air dried at room temperature afterwards while still clamped within the frame.

Figure 8A:
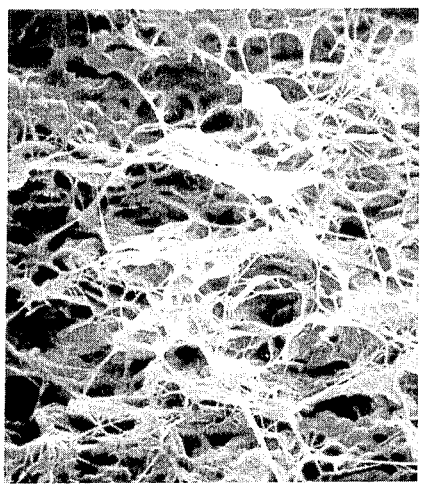
FIGS. 8A, 8B and 8C are scanning electron photomicrographs of UHMW-PE samples produced by prior art methods for comparative purposes.
Figure 8B:
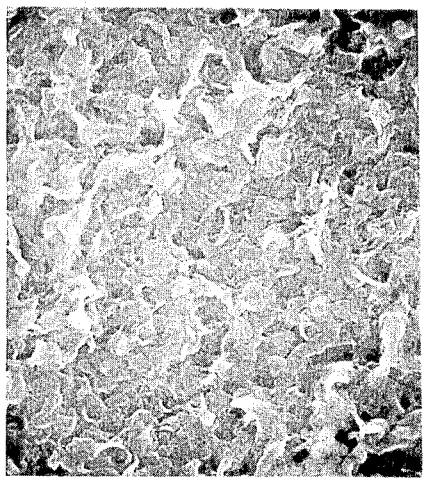
Figure 8C:
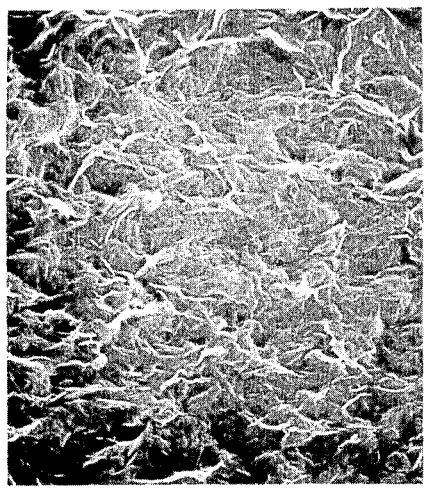

The sample was white and relatively shiny on the surface which had contacted the steel plate. The other surface was dull and quite uneven. Scanning electron photomicrographs of the surfaces and cross-section are shown in FIG. 8. They reveal the dense nature (absence of openings) of the surface. The interior is porous. Due to the unevenness of one of the surfaces, the porosity was difficult to determine accurately but estimated to be approximately 65%. A disc (thickness ~330 μm) was cut from the sample and measured for MeOH bubble point and water flow rate. The results were as follows:

| | |
|---|---|
| MeOH Bubble Point = | 55 psi |
| Water Flow Rate = | 0.15 ml/min/cm². |

The water flow rate of this sample would be too low for its measured MeOH bubble point to have practical utility as a filtration medium. Such a system falls below the flow rate vs. bubble point curve of FIG. 5. It was also noticed during the bubble point measurement that the number of bubble streams did not increase continuously with applied pressure after the bubble point. This suggested non uniformity of pore distribution in the sample, with a few relatively open pores within a mostly dense surface, and thus the low overall permeability Attempts to cast thinner samples using the 10% dispersion of UHMW-PE in mineral oil resulted in films that had visible pin-holes scattered throughout. These samples would have MeOH bubble points of <1 psi.

EXAMPLE 9

MICROPOROUS MEMBRANE PRODUCED FROM UHMW-PE AND HDPE MIXTURE

HDPE pellets (American Hoechst Hostalen GM5010T2N) were ground into fine powder and mixed with UHMW-PE (Himont 1900) at a ratio of 10 parts to 90 parts UHMW-PE by weight.

A 10% (w/w) dispersion of the polymer mixture in mineral oil (viscosity=60 cst at 40° C. and specific gravity=0.88 at 25° C.) was prrepared at room temperature and used for thin film extrusion by a method similar to that described in Example 1. The Koch static mixer (See Example 2) was employed in the extrusion setup. The temperatures of the extruder screws, metering pump, static mixer and the vertical exiting die were maintained at 220°, 220°, 200° and 170° C., respectively. The extrudate output was 5 gm/min. The water quench bath temperature was 45° C., and the extruded film thickness was approximately 115 μm. The sample was clamped as in Example 1, extracted in hexane and dried as in Example 2. Properties of this sample were as follows:

| | |
|---|---|
| Porosity = | 78% |
| Thickness = | 95 μm |
| Air Flow Rate = | 1.0 lit/min/cm² |
| Water Flow Rate = | 6.6 ml/min/cm² |
| MeOH Bubble Point = | 20 psi |
| Water Intrusion Pressure = | 55 psi |
| Tensile strength = | 934 psi (MD) |
| | 766 psi (TD) |
| Elongation at Break = | 326% (MD) |
| | 765% (TD) |
| Melting Temperature = | 135° C. |

INDUSTRIAL APPLICABILITY

The invention described herein is useful in the production of permeable or non-permeable microporous membranes from UHMW-PE. Permeable microporous membranes produced from UHMW-PE have a wide variety of uses, including uses as filtration media for filtering liquids and gases and as water-resistant breathable fabrics. Non-permeable UHMW-PE microporous membranes are useful as plumbers' sealing tape, heat insulating films and as carriers for controlled release of chemicals, drugs, or other agents.

EQUIVALENTS

Those skilled in the art will recognize, or be able to ascertain, using no more than routine experimentation, many equivalents to the specific embodiments of the invention described herein.

For example, UHMW-PE is a specific example of a class of semi-crystalline polyolefin materials which show similar structural, processing and property characteristics. Thus, the process for membrane formation, as described in this invention, is believed to be applicable to other semi-crystalline olefin polymers of ultra-high molecular weight. For example, ultra-high molecular weight polypropylene would be similar to UHMW-PE in that it would not flow under ordinary test conditions and also have the potential of superior properties. Such a material would be soluble at high temperatures in a porogen and be amendable to the extusion and other processing steps described in this invention. Thus, using the the processing technology herein described, unique useful membranes of different ultra-high molecular weight polyolefins could be obtained by one skilled in the art.

These and all other equivalents are intended to be encompassed by the following claims.

We claim:

1. A method for producing a microporous UHMW-PE membrane, including the steps of
   a. forming a mixture comprising UHMW-PE and a porogen;
   b. heating the mixture to an elevated temperature to produce a solution of UHMW-PE and porogen;
   c. extruding the solution of UHMW-PE and porogen through a forming die under moderate shear sufficient to enable employment of conventional extrusion equipment and/or techniques to thereby form a membrane;
   d. cooling the membrane sufficiently to cause phase separation resulting in a polymer-rich, porogen-poor phase and a polymer-poor, porogen-rich phase in said membrane;
   e. creating a microporous structure in the membrane by removing porogen from said membrane;
   f. drying the microporous membrane.

2. A method of claim 1 wherein said UHMW-PE is present in the mixture of UHMW-PE and porogen in an amount of from about 2% to about 20%, by weight, based upon UHMW-PE and porogen.

3. A method of claim 2 wherein porogen is removed by extraction.

4. A method of claim 3 wherein the membrane is restrained during extraction to minimize collapse of the microporous structure.

5. A method of claim 4 wherein the membrane is restrained during drying to minimize collapse of the microporous structure.

6. A method of claim 5 wherein the membrane is formed by extruding the solution through a slot die.

7. A method of claim 6 wherein said porogen comprises mineral oil.

8. A method of claim 7 wherein the membrane is cooled by immersing it in a liquid bath.

9. A method of claim 7 wherein the membrane is cooled by bringing it into contact with a solid surface.

10. A method of claim 5 wherein the membrane is formed by extruding the solution through a blown film die.

11. A method of claim 10 wherein said porogen comprises mineral oil.

12. A method of claim 11 wherein said hollow fiber membrane formed is cooled with fluid.

13. A method of claim 10 wherein the membrane formed by the blow film die is cooled with fluid.

14. A method of claim 5 wherein the membrane is formed by extruding the solution through a hollow fiber die.

15. A method for producing a microporous ultra-high molecular weight polyolefin membrane, including the steps of:

a. forming a mixture comprising ultra-high molecular weight polyolefin and a porogen;

b. heating the mixture to an elevated temperature to produce a solution of ultra-high molecular weight polyolefin and porogen;

c. extruding the solution of ultra-high molecular weight polyolefin and porogen through a forming die under moderate shear sufficient to enable employment of conventional extrusion equipment and/or techniques to thereby form a membrane;

d. cooling the membrane sufficiently to cause phase separation resulting in a polymer-rich, porogen-poor phase and a polymer-poor porogen-rich phase in said membrane;

e. creating a microporous structure in the membrane by removing porogen from said membrane;

f. drying the microporous membrane.

* * * * *